INVENTOR.
William T. Curless
BY
Carl A. Cline
ATTORNEY.

3,554,729
MANUFACTURE OF LOW CHLORIDE POTASSIUM PHOSPHATE FERTILIZER
William T. Curless, Overland Park, Kans., assignor to Gulf Research & Development Company, Pittsburgh, Pa., a corporation of Delaware
Continuation-in-part of application Ser. No. 578,212, Sept. 9, 1966. This application Aug. 28, 1969, Ser. No. 853,692
Int. Cl. C05b 7/00
U.S. Cl. 71—34                       5 Claims

ABSTRACT OF THE DISCLOSURE

In the manufacture of potassium acid phosphate for formulation into concentrated fertilizers having not more than 2 percent chloride, utilizing the reaction of potassium chloride with commercial phosphoric acid of strengths ranging from that of wet process to superphosphoric, improved removal of hydrogen chloride within the desirable reaction temperature within the range of about 70° C. to 200° C. is obtained by reduced pressure combined with steam stripping, in the presence of at least 0.02 mole of sulfuric acid per mole of potassium chloride. Though neither reduced pressure nor sparging steam or other inert gas into the reaction mixture is effective to remove all of the hydrogen chloride at equilibrium temperature, inert gas sparging greatly improves the release of hydrogen chloride under reduced pressure and makes it feasible to obtain a product having a very low chloride content.

DESCRIPTION OF THE INVENTION

Figure 1:
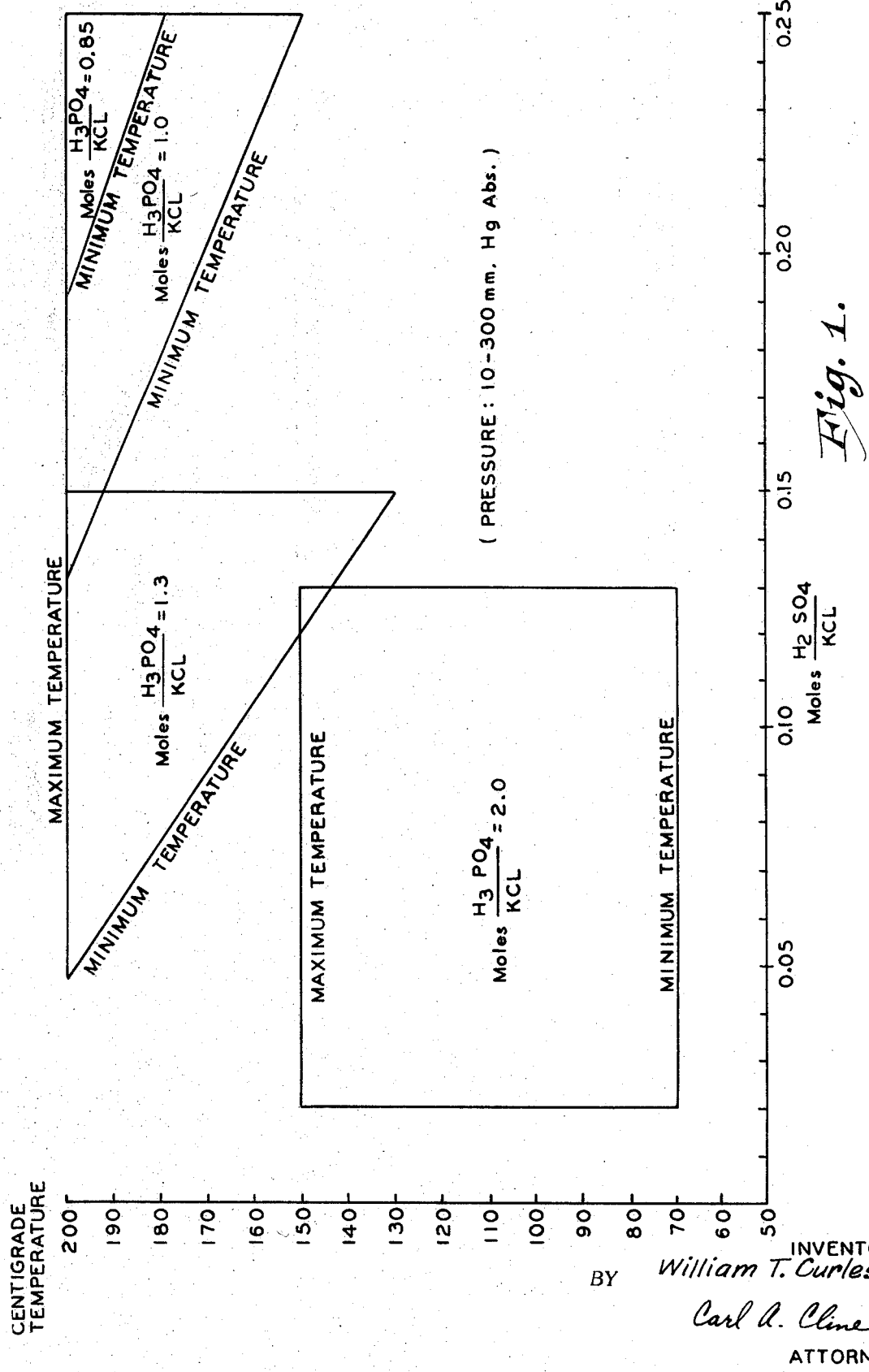

This application is a continuation-in-part of U.S. Ser. No. 578,212, filed Sept. 9, 1966 and now abandoned.

Chemical fertilizers originally were manufactured as substitutes for manure. The nature of fertilizer products and the method of manufacturing these products, however, have changed drastically with the development of modern agricultural practices. The present trend in production of plant products is toward obtaining maximum yields per unit area of ground. Involved in the trend toward maximum yields are the planting of the same crops year after year on the same ground, growing a larger number of individual plants per unit area, use of new plant varieties bred specifically for crowded planting with maximum yield and very high rates of application of chemical fertilizers. It is essential to the success of this intensive type of agriculture that chemical fertilizers employed in such a scheme consist of plant nutrients in a form which is readily available to the plants. Furthermore, it is necessary to supply to the plants a combination of all of the necessary plant nutrients so that the effect of high fertility in all respects is obtained. Over-supply of a few of the necessary nutrients will not give completely satisfactory results. In this maximum yield type of plant culture, fertilizers which are no more than substitutes for manure cannot be tolerated. The content of plant nutrients in acceptable fertilizer products must be a much higher weight percent than has been true of fertilizer products in the past. It has been estimated that the agriculture of the United States now operates at a net fertility loss, using and wasting several times as much of the important soil minerals as it replaces in fertilizer. (Net loss of 2¼ times for phosphate, 7½ times for potassium, 4 times for calcium, 3½ times for magnesium.) Maximum yields of plant crops cannot be maintained by operation with a net fertility loss. Thus, a high rate of application of fertilizer is an absolute necessity. When chemical fertilizer is applied in the high rates necessary to maintain fertility and maximum yields, it is important that undesirable substances such as chloride ion be eliminated from the fertilizer so as to prevent accumulation in the soil to an undesirably high concentration. The type of chemical fertilizer product which is suitable for modern agricultural methods is then a composition which is both concentrated with respect to important plant nutrients and relatively free of substances such as chloride ion.

This invention is directed to the manufacture of fertilizer compositions which are high in phosphorus and potassium content but low in chloride content. The method is one in which potassium chloride is reacted with phosphoric acid with removal of chloride as hydrochloric acid. The fundamental reaction is straight-forward but operation of the reaction in an industrial process presents difficult problems. The fertilizer industry has for many years studied the problem of the economical elimination of chloride from potassium chloride and thereby the development of a practical process for the production of highly concentrated, essentially chloride-free materials for use in fertilizers. Numerous methods have been proposed for the preparation of various potassium phosphates by reaction of potassium chloride and phosphoric acid, but none has yielded a commercially attractive process.

There are numerous difficulties involved in reducing the reaction of potassium chloride with phosphoric acid to a practical process for the preparation of fertilizers and fertilizer precursors. The process should be maintained below 200° C. for three reasons. First, impurities normally associated with fertilizer grade phosphoric acid, particularly iron and magnesium, react with the phosphorus and potassium components of the system above about 200° C. to form complex materials which are unavailable for utilization by plants. Second, the higher the temperature the greater the rate of corrosion of metal equipment. At temperatures near or above 200° C., the cost of suitable materials of construction increases to such an extent that the process cannot be operated economically. Third, the type of acid normally used for fertilizer, so called wet process phosphoric acid, contains organic material unless it is specially treated at additional cost. If the temperature of the process is maintained below about 200° C. under the conditions of this invention, the hydrochloric acid which is evolved from the process and which may be sold as a valuable by-product is of good quality. Below about 150° C. the hydrochloric acid is nearly water white. Above about 200° C. organic material associated with the phosphoric acid is evolved, contaminating the hydrochloric acid and producing a dark amber color.

Any practical process should be sufficiently flexible to permit the preparation of a wide variety of fertilizer compositions. It is particularly desirable to produce low-chloride fertilizers having a $P_2O_5$ to $K_2O$ weight ratio of 3 or below. Ratios of 2:1 and even 1:1 make up large tonnages of so-called mixed fertilizers sold in this country. Although any reduction in chloride content of fertilizer confers some benefit, to be universally accepted as a low-chloride fertilizer, the finished fertilizer should contain 2% or less of chloride, as required for certain crops. To meet this requirement the chloride content of the product from the reaction of potassium chloride and phosphoric acid should be about 3% or less.

A number of workers have described specific methods for the elimination of chloride from potassium chloride by reaction with phosphoric acid. Ross et al., U.S. 1,456,831, May 29, 1923, teach the reaction of potassium chloride with phosphoric acid at temperatures of 250° C. and above and describe the use of air to increase the rate of HCl evolution. Askenasy et al., Z. Anorg. u. allgem. Chem. 189, 305–28 (1930), discuss the use of steam in place of air for increasing the rate of reaction of potassium chloride with phosphoric acid and indicate that at temperatures near 150° C. a reaction time of 4 hours is necessary to prepare a product less than 85 percent reacted (4% chloride) when a 1.75 to 1 mole ratio of $P_2O_5$ to $K_2O$ is used. Even at 200° C. a reaction time of 3 hours is required to obtain a product containing 4 percent chloride.

Britzke et al., J. Chem. Ind. (Moscow), 7, 4–11 (1930), describe experiments similar to those of Askenasy et al. as well as the use of reduced pressure in accelerating the reaction of potassium chloride with phosphoric acid. The use of reduced pressure is also mentioned by Kaselitz, U.S. 1,805,873, May 19, 1931. Kaselitz produces the acid salt $KH_2PO_4 \cdot H_3PO_4$ by reacting phosphoric acid and potassium chloride with an aqueous solution containing about 34 percent phosphoric acid, 31 percent monopotassium phosphate and 35 percent water. It is then necessary to remove the acid salt from the slurry and convert it to monopotassium phosphate by treating it with a solution saturated with potassium orthophosphate. The liquor obtained from this separation may then be used as a starting material in a new operation.

Recently Provoost, Fr. 1,395,837, Mar. 8, 1965, has described the preparation of a specific fertilizer having a $P_2O_5$ to $K_2O$ weight ratio of 1:1 by addition of 1 mole of sulfuric acid for each two moles of phosphoric acid used in the reaction. Provoost also describes the use of air to increase the rate of reaction. Apparently the composition of the wet process phosphoric acid employed by Provoost (or some other undisclosed factor) is critical, because the results are difficult to reproduce.

It has been disclosed in prior publications, particularly by Britzke et al. that the effect of reduced pressure and steam or air on the reaction of potassium chloride with phosphoric acid are equivalent and their effect is to increase reaction rate. It has now been shown, and is disclosed herein, that the use of these two factors together produces results significantly greater than either alone. This is also true when reduced pressure is applied to the reaction of potassium chloride and phosphoric acid in the presence of a small proportion of sulfuric acid and, indeed, reaction is further enhanced when steam is utilized in conjunction with reduced pressure in the reaction of sulfuric acid, phosphoric acid and potassium chloride. Steam or other inert gas has been discovered to affect the extent of reaction as well as rate, causing resumption of liberation of hydrogen chloride after equilibrium conditions have been obtained and the reaction has ceased. This previously unknown effect is believed to account for the benefit obtained by the combination of reduced pressure with inert gas sparging of the reaction mixture. The judicious application of the combination of conditions allows, for the first time, the economical production of a wide variety of low-chloride fertilizers by the reaction of phosphoric acid and potassium chloride.

It has now been found that the reaction of potassium chloride with phosphoric acid may be carried out at moderate temperatures to produce a wide variety of fertilizer ratios high in potassium and phosphorus content. Concurrently, a marketable grade of hydrochloric acid is obtained directly. This is accomplished by the use of reduced pressure and sparging with steam, or other non-reactive gas in the presence of a minor proportion of sulfuric acid, preferably at least 0.02 mole of sulfuric acid per mole of potassium chloride. By this method of operation, temperatures may be employed, preferably within the range of about 70° C. to 200° C., and between 100° C. and 190° C., in most instances, to prepare products having $P_2O_5$ to $K_2O$ weight ratios ranging from about 3–1 to about 1.25–1. In this invention the absolute pressure within the reaction vessel is reduced to between 10 and 300 mm. Hg absolute, preferably to between 30 and 100 mm. Hg. The amount of sulfuric acid is preferably between 0.02 and 0.25 mole $H_2SO_4$ per mole of KCl. The choice of temperature, absolute pressure, amount of sulfuric acid and the use of steam is dependent upon the fertilizer ratio being produced.

The preferred minimum operating temperature and mole ratio of sulfuric acid to KCl both vary with the chosen $H_3PO_4$ to KCl reaction ratio. When the chosen mole ratio is 2.0, the $H_2SO_4/KCl$ ratio is within the range of 0.02 to 0.13 and the minimum temperature is about 70° C., as shown in FIG. 1. When the chosen ratio is about 1.3, the minimum operating temperature varies as a straight line function from 200° C. at a $H_2SO_4/KCl$ mole ratio of 0.05 to 130° C. at a $H_2SO_4/KCl$ mole ratio of 0.15.

When the $H_3PO_4/KCl$ mole ratio is 1.0, the minimum operating temperature varies as a straight line function from 200° C. at a $H_2SO_4/KCl$ mole ratio of 0.13 to 150° C. at a $H_2SO_4/KCl$ mole ratio of 0.25.

When the $H_3PO_4/KCl$ mole ratio is 0.85, the minimum operating temperature varies as a straight line function from 200° C. at a $H_2SO_4/KCl$ mole ratio of 0.19 to 180° C. at a $H_2SO_4/KCl$ mole ratio of 0.25.

The above $H_3PO_4/KCl$ mole ratios are discussed specifically because they are preferred commercially for ammoniation to produce readily salable products with desirable N-P-K ratios. The reasons for desirability of certain N-P-K ratios are to some extent purely a matter of personal convenience to those who wish to calculate a proper fertilizer combination to suit a particular soil and crop. It is a fact that these people prefer simple whole numbers in the ratios, for ease of calculation. This has nothing to do with fertilizer quality, but is a factor which must be considered in fertilizer manufacture. The above data are displayed graphically in the chart of FIG. 1 in which zones are drawn on a plot of centigrade temperature versus $H_2SO_4/KCl$ mole ratio.

In the process of the present invention, a reaction is carried out under fluid melt conditions at a temperature below about 200° C. but above the melting point of the mixture of reactants. It has been found that if the temperature decreases below the melting point of the reaction mixture, reaction rate decreases to such an extent as to be impractical. The initial reaction mixture consists essentially of potassium chloride, phosphoric acid and minor proportions of sulfuric acid. The mole ratio of sulfuric acid to potassium chloride may vary from 0.02 to about 0.3, at which ratio the phosphoric acid to potassium chloride mole ratio may be as low as 0.8. The difficulty of temperature control, however, makes it impractical to operate below about 0.85 mole of phosphoric acid per mole of potassium chloride and with a $H_2SO_4/KCl$ mole ratio of 0.25. The reaction mixture may contain a variable quantity of water initially but the water is driven off along with hydrogen chloride in the course of the reaction.

It is feasible to operate the process with an extremely small amount of water by employing commercial superphosphoric acid, which has a phosphorus content of just under 37 percent, as described in specific examples below. In this latter type of operation it is possible to produce dry hydrogen chloride as a separate by-product. The reaction is carried on below atmospheric pressure, the same as when phosphoric acid of lower concentration is employed. The most convenient range of pressure is usually about 40 to 65 mm. Hg absolute when a single steam ejector is employed to obtain reduced pressure. The final amount of hydrogen chloride is removed from the reaction mixture while under reduced pressure by surface to surface contact of the fluid melt with a non-reacting gas, such as steam or air, preferably steam.

Figure 2:
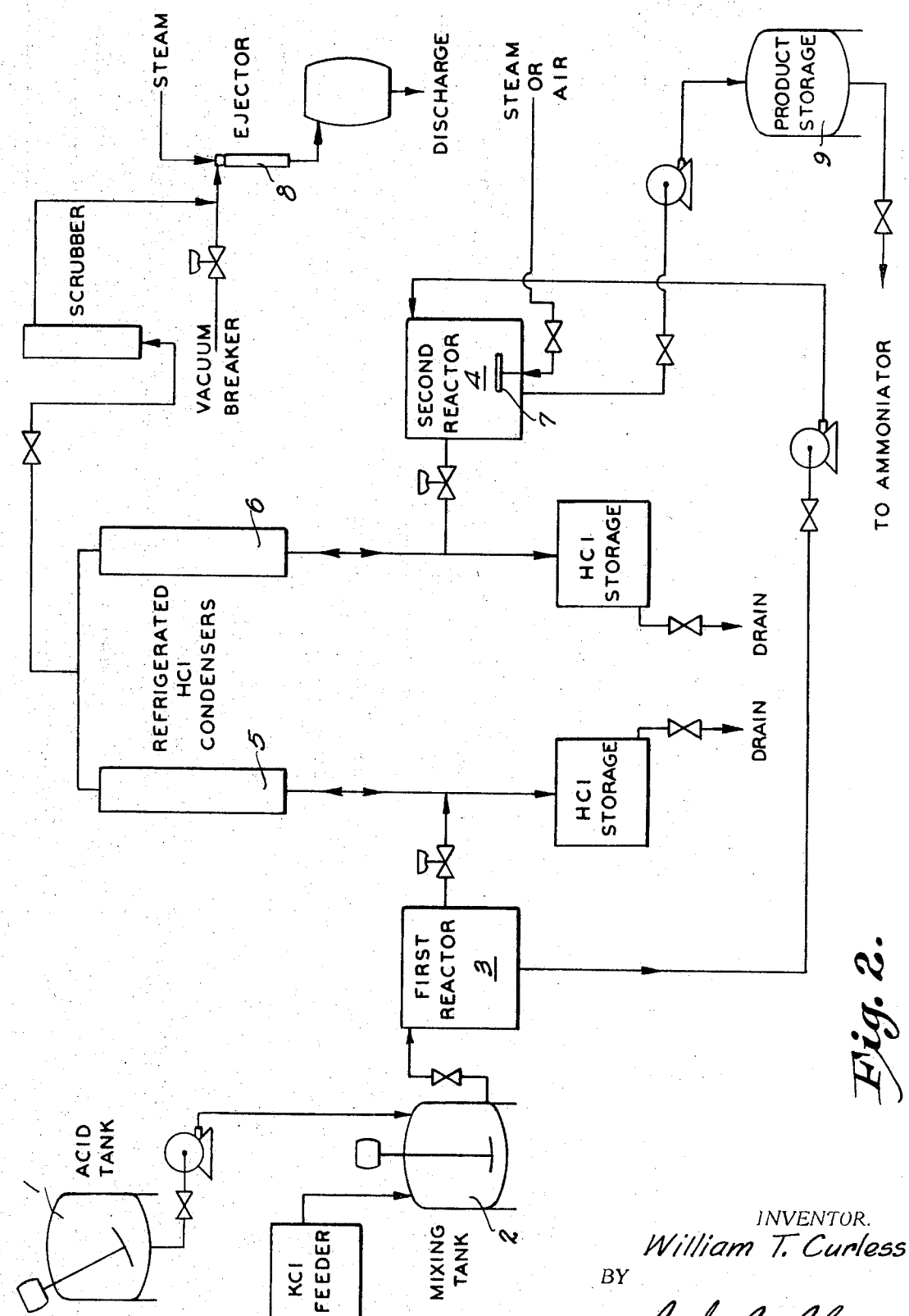

The operational scheme of the process will be understood by reference to FIG. 2. The acid tank 1 is preferably fitted with an agitator so as to keep suspended all of the solids which are found in wet process phosphoric acids of fertilizer grade.

The phosphoric acid is pumped to a mixing tank 2, into which there is also fed by a suitable means solid potassium chloride of sufficient purity for fertilizer use. The sulfuric acid content of the reaction system may be adjusted to the desired level at this stage of the process.

Although the reaction could be carried out batchwise or continuously in a single reactor, the process may be operated more economically by conveying the reaction mixture to a first reactor 3, in which the initial vigorous evolution of hydrogen chloride occurs under reduced pressure, then transferring the reaction mixture to a second reactor 4, after the initial gas evolution has subsided. The reaction mixture is then subjected to both reduced pressure and inert gas sparging in the second reactor, as indicated on the diagram. The hydrogen chloride which is evolved from the two reactors is recovered in refrigerated condensers 5 and 6 and ordinarily will be of differing water contents. The two hydrogen chloride products are conveniently stored separately and may be blended for sale at different concentrations. If dry hydrogen chloride is one of the products, it is preferably put in containers under pressure and marketed as a separate product.

In the operation of the process in the manner illustrated in FIG. 2, a suspension is ordinarily obtained in the mixing tank 2 because of the low solubility of the potassium chloride in the acid mixture. Upon heating under reduced pressure in the first reactor 3, there is vigorous evolution of both hydrogen chloride and water vapor and most of the suspended solids appear to go into solution. Eventually the evolution of vapor practically ceases, most of the water having been removed and the reaction rate having changed abruptly to a rate so low as to make further reaction under these conditions impractical. It has been found that opening the reactor to the atmosphere and blowing with steam or air at this point does not appear to improve the rate of removal of hydrogen chloride appreciably. In this sense, the use of reduced pressure and steam sparging are equivalent. It is here that the problem arises which is dealt with by the present invention, since it is not feasible to continue to remove hydrogen chloride from the fluid melt consisting essentially of potassium chloride, potassium phosphate, phosphoric acid, and a minor amount of sulfuric acid.

The process conditions according to this invention are maintained in the second, or main reactor 4, with inert gas being introduced through the sparger 7. Reaction temperature is maintained by means of suitable heat exchange coils in contact with the mixture and the entire system is maintained under reduced pressure by means of a steam ejector 8, or other suitable pumping arrangement.

The effect of reduced pressure in the reaction rate in reactor 4 during sparging is surprising. There is no satisfactory explanation of the interaction between the two process conditions. However, it is apparent that the viscous fluid melt reaction mixture behaves in an abnormal manner. It is postulated that further reaction probably occurs only where suitable conditions are maintained at liquid-gas interfaces. Under the combined effects of sparging and reduced pressure the reaction rate appears to return to a value which corresponds to an extrapolation of the curve of the rate of the original vigorous reaction, decreasing with time, until a point is reached at which the rate declines abruptly and removal of the remaining traces of hydrogen chloride occurs very slowly. A satisfactory product for use in manufacture of low chloride fertilizers may be obtained, however, before the abrupt decline in reaction rate occurs.

The product is obtained as a fluid melt of potassium phosphate, phosphoric acid and a minor amount of sulfuric acid and is conveniently kept hot and sufficiently fluid for pumping in insulated storage 9 until employed in ammoniation, granulation or other fertilizer manufacturing operations.

The fluid melt product obtained as outlined above possesses a very low chloride content (3 percent or less) so it is suitable for incorporation in fertilizer mixes and compositions in which the specified overall chloride content of the finished fertilizer is below 2 percent. The material produced according to the procedure of this invention is relatively hygroscopic. It may readily be converted to a relatively non-hygroscopic fertilizer by reaction with ammonia. In one method, the melt produced according to the procedure of this invention is cooled and reacted with ammonia while simultaneously being particularized or reduced, by grinding or other techniques, to small particles, at the same time maintaining a moisture content in the mixture of about 2 to 5 percent. Such a moisture content is necessary to maintain a rapid rate of ammoniation. The final product is a pulverized, highly concentrated, nitrogen-phosphorus-potassium fertilizer which is substantially free of chloride salts. This product may be granulated directly by conventional procedures or mixed with other fertilizer components prior to granulation.

The original melt may also be converted in a single step to a finished fertilizer in an ammoniator-granulator of the type now extensively used in the fertilizer industry, taking advantage of the fluidity of the melt product to promote agglomeration of solids.

So that the operation of the process may be more fully understood, the following specific examples are presented by way of illustration.

EXAMPLE I

The following materials were placed in a reaction vessel: 245 grams of standard fertilizer grade potassium chloride and 865 grams of wet process phosphoric acid containing 23.8 percent phosphate expressed as P and 1.5 percent sulfuric acid expressed as S. At an absolute pressure within the reaction vessel of 50±10 mm. Hg the mixture was agitated vigorously and heated to 107° C. evolving steam and hydrogen chloride. The hydrogen chloride was diluted with sufficient water so that a colorless 20° Bé. solution of hydrochloric acid was obtained. The product remaining in the reaction flask was a viscous material which hardened on cooling. The solid product obtained on cooling contained 1.9 percent Cl, 50 percent $P_2O_5$ and 16.4 percent $K_2O$. All of the phosphorus and potassium were found to be available to plants. A portion of the solid product obtained on cooling was reheated to 107° C. and steam was blown through it. Analysis of the product from this further reaction indicated that the percent chloride had declined from the original 1.9 percent to less than 0.2 percent. The solid product was readily ammoniated to a hard, easily pulverized, relatively non-hygroscopic solid containing 9 percent N.

EXAMPLE II

Several experiments were run in the manner of Example I to illustrate the advantage of using a combination of reduced pressure and steam, sulfuric acid and vacuum, and sulfuric acid, vacuum and steam. The results of these experiments are summarized in Table I. The weight ratio of phosphoric acid to potassium chloride was in each case the same as Example I. Standard fertilizer grade potassium chloride was used in each experiment. Wet process phosphoric acid was used in Experiments 1, 3, 4 and 5. Furnace grade phosphoric acid diluted with water to 54 percent $P_2O_5$ was used in Experiment 2. The solid products from each of these experiments were readily ammoniated to give complete fertilizers containing N, $P_2O_5$ and $K_2O$ all in forms readily available to plants.

TABLE I

|  | Mole ratio, $H_2SO_4/H_3PO_4/KCl$ | Absolute pressure, mm. Hg | Reaction temperature, °C. | Chloride in solid product, percent | |
|---|---|---|---|---|---|
|  |  |  |  | Before steam sparging | After steam sparging |
| Experiment:[1] |  |  |  |  |  |
| 1 | 0.1/2/1 | 10-20 | 70 |  | 2.0 |
| 2 | 0/2/1 | 55-65 | 105 | 3.7 | 1.9 |
| 3 | 0.1/2/1 | 55-65 | 135 | 1.6 | 0.2 |
| 4 | 0.1/2/1 | 280-300 | 135 |  | 3.0 |
| 5 | 0.1/2/1 | ([2]) | 150 |  | 5.5 |

[1] Total reaction time in each experiment was <2 hours.
[2] Atmospheric.

It will be seen from these results that steam sparging at atmospheric pressure, even at the highest reaction temperature, was not sufficiently effective. Sparging at reduced pressure, however, was more effective than either reduced pressure or steam sparging alone.

EXAMPLE III

A mixture of 75 grams of standard fertilizer grade potassium chloride containing 47.5 percent Cl and 50.3 percent K was made with 177 grams of wet process phosphoric acid containing 23.8 percent phosphate expressed as P and 1.5 percent sulfuric acid expressed as S. This mixture was heated to 190° C. at an absolute pressure of 55 mm. Hg. The reaction was rapid, appearing to be complete in less than 1 hour. The very viscous product within the reaction flask was cooled forming a solid which on analysis showed 2.6 percent Cl, 52.6 percent $P_2O_5$ and 25.9 percent $K_2O$. A portion of the solid was reheated to 190° C. and steam sparged for 30 minutes at an absolute pressure of between 55 and 65 mm. of Hg. On cooling when the solid was analyzed it showed a reduction of chloride content to a value of 1.0 percent Cl. Both solids could be readily ammoniated to give a free-flowing, relative non-hygroscopic fertilizer containing about 7 percent N.

EXAMPLE IV

In a reaction vessel, 75 grams of standard fertilizer grade potassium chloride, 177 grams of wet process phosphoric acid having the same analysis as that in Example III were mixed with 5.1 grams of 79 percent sulfuric acid. The absolute pressure within the reaction vessel was then decreased to between 40 and 55 mm. Hg and the reaction mixture therein heated to 140–145° C. During this time, hydrogen chloride and steam were evolved from the reaction mixture. After 50 minutes at a temperature between 140 and 145° C., the viscous product from the reaction vessel was removed and cooled. Analysis showed 3.0 percent Cl. On reheating to 140–145° C. under 40–55 mm. Hg while sparging steam through the reaction mixture, chloride content of the product was decreased to 2.5 percent Cl. The product was readily ammoniated as in Example III to give a free-flowing product containing 5.9 percent N.

EXAMPLE V

Several experiments have been selected for this example in order to show the effect of utilizing at a suitable reaction temperature, various combinations of (1) sulfuric acid and degree of reduced pressure, (2) reduced pressure and steam, and (3) reduced pressure, steam and sulfuric acid. The chloride content of the final product is shown in Table II. The procedure for each of these experiments was similar to that of Examples III and IV. The ratio of phosphoric acid to potassium chloride was the same as that for Examples III and IV. Wet process phosphoric acid was used in each experiment except Experiment 1, which was operated with furnace grade phosphoric acid. Standard fertilizer grade potassium chloride was used in each case.

TABLE II

|  | Mole ratio, $H_2SO_4/H_3PO_4/KCl$ | Absolute pressure, mm. Hg | Reaction temperature, °C. | Chloride in solid product, percent | |
|---|---|---|---|---|---|
|  |  |  |  | Before steam sparging | After steam sparging |
| Experiment: |  |  |  |  |  |
| 1 | 0/1.3/1 | 15 | 145-150 | 3.5 | 3.0 |
| 2 | 0.06/1.3/1 | 15 | 145-150 | 2.9 | 2.4 |
| 3 | 0.06/1.3/1 | 55 | 145-150 | 6.4 | 5.2 |
| 4 | 0.11/1.3/1 | 55 | 180-190 | 1.6 | 0.6 |
| 5 | 0.06/1.3/1 | 300 | 145-150 | 7.4 |  |
| 6 | 0.06/1.3/1 | ([1]) | 145-150 | 10.2 | 6.5 |

[1] Atmospheric.

From these results it is apparent that the presence of a minor amount of sulfuric acid improves the effectiveness of reduced pressure sparging.

EXAMPLE VI

A mixture of 24.8 grams of 79 percent sulfuric acid, 129 grams of wet process phosphoric acid, and 75 grams standard fertilizer grade potassium chloride was prepared in a reaction vessel. This mixture was heated to 145–150° C. at an absolute pressure of 60 mm. Hg. Reaction time was approximately 1 hour. A portion of the viscous liquid was cooled to give a solid which analyzed 3.0 percent Cl, 39.0 percent $P_2O_5$ and 27.0 percent $K_2O$. Steam was sparged through the remaining viscous liquid at 145–150° C. and between 60 and 65 mm. Hg absolute pressure. Both products when cooled formed solids which were readily ammoniated to give complete fertilizers containing 6.2 percent ammoniacal nitrogen.

EXAMPLE VII

Example VI was repeated increasing the reaction temperature to 180–185° C. and decreasing the amount of 79 percent sulfuric acid added to 12.3 grams. The product without steam sparging analyzed 1.8 percent Cl.

EXAMPLE VIII

Example VII was repeated using the same quantities of wet process phosphoric acid and potassium chloride with a reaction temperature of 180–185° C. and decreasing the amount of 79 percent sulfuric acid to 0.06 mole $H_2SO_4$ per mole KCl. The product analyzed 3.5 percent Cl before steam sparging and 3.0 percent Cl after steam sparging. Phosphorus content was 42.8 percent $P_2O_5$ and potassium content 29.3 percent $K_2O$.

EXAMPLE IX

Example VI was repeated at 150° C. and 40 mm. Hg using the same wet process phosphoric acid as in Example VI and using the same potassium chloride but in this instance 28.8 grams of 79 percent sulfuric acid. The product on analysis without steam sparging contained 1.9 percent Cl.

EXAMPLE X

In a reaction vessel 14.0 grams of 79 percent sulfuric acid, 112.5 grams of wet process phosphoric acid analyzing 23.9 percent phosphoric acid expressed as P and 1.6 percent sulfate expressed as S were mixed with 75 grams of standard fertilizer grade potassium chloride and the resulting mixture heated to 190° C. The reaction mixture was agitated vigorously during this time and the absolute pressure within the reaction vessel was maintained at 55–57 mm. Hg. After 30 minutes at temperature, a portion of the viscous material was cooled to form a hard solid, which on analysis showed 4.7 percent Cl, 42.4 percent $P_2O_5$ and 31.4 percent $K_2O$. After steam sparging at 190° C. and 55–57 mm. Hg, the product analyzed 2.9 percent Cl and was ammoniated to yield a complete fertilizer containing 5.4 percent ammoniacal nitrogen.

EXAMPLE XI

Example X was repeated using 25.9 grams of 79 percent sulfuric acid. The product analyzed without steam sparging 2.5 percent Cl, 39.9 percent $P_2O_5$ and 30.4 percent $K_2O$.

EXAMPLE XII

Example X was repeated at 15 mm. Hg absolute pressure. Prior to steam sparging the product contained 3.8 percent Cl, and after steam sparging it contained 2.8 percent Cl.

EXAMPLE XIII

Example XII was repeated with 25.9 grams of 79 percent sulfuric acid. The product before steam sparging analyzed 1.8 percent Cl, 42.3 percent $P_2O_5$ and 32.3 percent $K_2O$.

EXAMPLE XIV

Example X was repeated at an absolute pressure within the vessel of between 280–296 mm. Hg. The product after 30 minutes at reaction temperature analyzed 5.6 percent Cl, 35.7 percent $P_2O_5$ and 27.7 percent $K_2O$. Steam sparging of this product at 185–190° C. and 290 mm. Hg gave a product after 45 minutes of reaction containing 3.0 percent Cl.

EXAMPLE XV

To illustrate the finding that the initial amount of water present in the reaction mixture does not contribute to the extent of reaction, two experiments were performed under conditions similar to those of Experiment 2 in Table I. Reagent grade chemicals were used. In one case the concentration of phosphoric acid entering was 86 percent $H_3PO_4$ and in the second case it was 55 percent $H_3PO_4$. This compares to 75 percent $H_3PO_4$ for Experiment 2 of Table I. After reaction at 105° C. at an absolute pressure of 55–65 mm. Hg, the product from the reaction utilizing 55 percent $H_3PO_4$ contained 3.6 percent Cl and that from the experiment utilizing 86 percent $H_3PO_4$ contained 3.1 percent Cl.

EXAMPLE XVI

In order to show the equivalence of air and steam sparging on the reaction of potassium chloride and phosphoric acid, three experiments were run in a manner similar to that described in the previous examples using wet process phosphoric acid, standard fertilizer grade potassium chloride and in two cases 79 percent sulfuric acid. The reactions were carried out at 185°, C. and 65 mm. Hg, absolute. The product from each of these reactions was separated into two portions, one of which was steam sparged and the other air sparged for an equivalent length of time. The essential equivalence of the chloride content of these reaction products, whether steam or air sparged, is shown in Table III. This table also shows the effect of air and steam on increasing the extent of chloride removal under conditions of reduced pressure.

TABLE III

| | Chloride in product prior to air or steam sparging | Chloride in product after air or steam sparging | |
|---|---|---|---|
| | | Steam sparge | Air sparge |
| Mole ratio, $H_2SO_4/H_3PO_4/KCl$: | | | |
| 0.23/0.85/1 | 2.5 | 1.0 | 1.2 |
| 0.09/1/1 | 5.5 | 4.2 | 4.2 |
| 0.10/1.3/1 | 2.4 | 1.2 | 1.3 |

As shown above, the effect of sparging is that of an inert gas, since air and steam produce substantially equivalent results. Obviously other inert gases may be employed. However, steam is an economical choice, particularly because condensation of steam, after sparging, aids in maintaining reduced pressure in the system.

The following examples illustrate the use of phosphoric acid of higher concentration in the process, thereby increasing the throughput and reducing the heat load of the reactors and yielding dry hydrogen chloride as a valuable by-product in the first, or preliminary reaction stage.

EXAMPLE XVII

This example illustrates preliminary reaction in the first reactor, in which the initial mole ratio of sulfuric acid to phosphoric acid to potassium chloride was 0.06 to 2 to 1. Two hundred grams of 72% $P_2O_5$ wet process superphosphoric acid was added to 77.8 g. of standard fertilizer grade potassium chloride in a 1-liter, baffled reactor. Pressure was reduced to 55 mm. Hg absolute. Temperature was increased to 135° C. for a 30-minute period and held at this temperature for an additional 40 minutes. Off gases were passed through a condenser into a series of receiver flasks containing weighed amounts of sodium hydroxide solution. Both the solid product in the reactor and the distillate were analyzed. The solid product analyzed 24.9% P, 16.2% K and 2.9% Cl. All of the phosphorus and potassium was available. Analysis of the HCl evolved indicated no water evolution.

EXAMPLE XVIII

Example XVII was repeated with 6.3 g. of 97.5% sulfuric acid added to the reactants. Results were similar except the solid product contained only 1.7% Cl.

EXAMPLE XIX

This example illustrates the preliminary reaction in which the mole ratio of sulfuric acid to phosphoric acid to potassium chloride is 0.08 to 1.33 to 1. A mixture of 133 g. of 72% $P_2O_5$ wet process superphosphoric acid, 77.8 g. of standard potassium chloride and 4.1 g. of 97.5% sulfuric acid was prepared. The reactants, in a 1-liter, baffled reactor, were agitated at 55 mm. Hg absolute while heating to 185° C., at which temperature it was held for 30 minutes. Effluent gases were collected as in Example XVII. Both solid product and distillate were analyzed. Analysis of the solid product showed 23.0% P, 20.7% K and 3.1% Cl. Analysis of the HCl evolved showed essentially no water present.

EXAMPLE XX

This example employed the same ratio of sulfuric acid to phosphoric acid to potassium chloride as Example XIX but was carried out with essentially reagent grade materials. A mixture of 376 g. superphosphoric acid prepared from elemental phosphorus and containing 33% P, 233.4 g. reagent grade potassium chloride and 12.7 g. of reagent grade 97.5% sulfuric acid were mixed in a 1-liter, baffled reactor and heated to 185° C. while at 55 mm. Hg absolute. After carrying out the remainder of the experiment in a manner similar to that of Example XIX, analyses of the solid product and distillate were made. The solid analyzed 22.8% phosphorus, 22.7% potassium and 5.1% chloride. Analysis of the distillate showed essentially no water.

The following examples illustrate operation of the method of the invention in the second stage reactor.

EXAMPLE XXI

Product from Example XVIII was placed in a vertical, cylindrical reactor containing a frit near the bottom. The reactor was heated to 185° C. and the pressure within the reactor reduced to between 70 and 75 mm. Hg. Air was sucked through the frit and thereby through the molten reaction product for 1 hour. The solid product contained 0.6% chloride as opposed to 1.7% chloride in the starting material from Example XVIII.

EXAMPLE XXII

Product from Example XIX was placed in the same reactor as that from Example XXI. The reactor was again heated to 185° C. and the pressure reduced to about 55 mm. Hg. Steam was sparged through the reaction mixture for 70 minutes. The product contained 1.0% chloride as opposed to 3.1% in the product from Example XIX.

The following examples illustrate a method of preparing a finished fertilizer from the product of the reaction of potassium chloride with phosphoric acid.

EXAMPLE XXIII 20.5 g. of the solid from Example XX was placed on a medium porosity frit within a cylindrical reactor. The reactor was positioned vertically and ammonia blown through from the bottom. Sufficient water was added to the product to maintain moisture at about 3% $H_2O$ throughout the ammoniation period. The solid was removed and ground occasionally. The reaction was judged complete when no increase in solids temperature occurred as ammonia was sparged through it. The solid was then submitted for analysis. Analysis showed 6.1% ammoniacal nitrogen, 23.0% phosphorus, 11.4% potassium. Each was fully available. The product was free flowing and nonhygroscopic.

EXAMPLE XXIV

About 20 g. each of solid from Examples XVIII, XIX and XXI were mixed with equal amounts of water after initial ammoniation as described in Example XXIII. The paste-like mixtures were then ammoniated by blowing ammonia through them after which they were dried at 70° C. under vacuum. Analyses showed the product from Example XVIII contained 10.5% ammoniacal nitrogen, 20.5% phosphorus and 12.4% potassium, 1.4% chloride, 4.2% sulfur and had a pH of 7.5. Product from Example XIX analyzed 7.4% ammoniacal nitrogen, 19.0% phosphorus, 17.5% potassium, 3.6% chloride, 3.8% sulfur and had a pH of 7.7. Product from Example XXI analyzed 11.6% ammoniacal nitrogen, 20.8% phosphorus, 12.9% potassium, 0.4% chloride, 4.2% sulfur and had a pH of 7.5. Each product was relatively nonhygroscopic. All of the products were no more hygroscopic than ammonium phosphate.

What is claimed is:

1. In the manufacture of fertilizer containing 2 percent or less of chloride, a process for manufacturing a potassium phosphate product with a chloride content of 3 percent or less, comprising the steps:

(a) reacting while maintaining fluid melt conditions at a temperature within the range of 70° C. to 200° C. a mixture of reactants consisting essentially of potassium chloride, a wet process phosphoric acid containing less than 37 percent phosphorus and from 0.02 mole of sulfuric acid per mole of potassium chloride at a $H_3PO_4/KCl$ mole ratio of 2.0, to 0.25 mole of sulfuric acid per mole of potassium chloride at a $H_3PO_4/KCl$ mole ratio of 0.85, and a minimum reaction temperature ranging from 70° C. at a $H_3PO_4/KCl$ mole ratio of 2.0, to 180° C. at a $H_3PO_4/KCl$ mole ratio of 0.85 and (b) removing hydrogen chloride and water from the reaction mixture by passing a stream of nonreactive gas through the fluid melt reaction mixture while maintaining an absolute pressure on the reaction mixture within the range of 10 to 300 millimeters of mercury.

2. A process according to claim 1 in which the nonreactive gas is selected from the group consisting of steam and air, the $H_3PO_4/KCl$ mole ratio is 2.0, the $H_2SO_4/KCl$ mole ratio is within the range of 0.02 to 0.13 and the minimum operating temperature is 70° C.

3. A process according to claim 1 in which the nonreactive gas is selected from the group consisting of steam and air, the $H_3PO_4/KCl$ mole ratio is 1.3 and the minimum operating temperature varies as a straight line function, from 200° C. at a $H_2SO_4/KCl$ mole ratio of 0.05, to 130° C. at a $H_2SO_4/KCl$ mole ratio of 0.15.

4. A process according to claim 1 in which the nonreactive gas is selected from the group consisting of steam and air, the $H_3PO_4/KCl$ mole ratio is 1.0 and the minimum operating temperature varies as a straight line function, from 200° C. at a $H_2SO_4/KCl$ mole ratio of 0.13, to 150° C. at a $H_2SO_4/KCl$ mole ratio of 0.25.

5. A process according to claim 1 in which the nonreactive gas is selected from the group consisting of steam and air, the $H_3PO_4/KCl$ mole ratio is 0.85 and the minimum operating temperature varies as a straight line function, from 200° C. at a $H_2SO_4/KCl$ mole ratio of 0.19, to 180° C. at a $H_2SO_4/KCl$ mole ratio of 0.25.

References Cited

UNITED STATES PATENTS

| | | | |
|---|---|---|---|
| 1,456,831 | 5/1923 | Ross et al. | 23—107 |
| 1,805,873 | 5/1931 | Kaselitz | 23—107 |
| 2,157,879 | 5/1939 | Zublin | 23—3 |

FOREIGN PATENTS

| | | | |
|---|---|---|---|
| 1,395,837 | 3/1965 | France | 71—36 |

OTHER REFERENCES

Askenasy et al., Zeit. Anorg. u. Allgem. Chemie, vol. 189, 1930, pp. 305–311.

REUBEN FRIEDMAN, Primary Examiner

B. H. LEVENSON, Assistant Examiner

U.S. Cl. X.R.

23—107; 71—36, 37